US008555266B2

(12) United States Patent  (10) Patent No.: US 8,555,266 B2
Copeland et al.  (45) Date of Patent: Oct. 8, 2013

(54) MANAGING VARIABLE ASSIGNMENTS IN A PROGRAM

(75) Inventors: Reid T. Copeland, Markham (CA); Mark Graham Stoodley, Markham (CA); Vijay Sundaresan, North York (CA); Ning Thomas Wong, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 11/938,884

(22) Filed: Nov. 13, 2007

(65) Prior Publication Data

US 2009/0125893 A1 May 14, 2009

(51) Int. Cl.
*G06F 9/45* (2006.01)
(52) U.S. Cl.
USPC .......................... 717/151; 717/154
(58) Field of Classification Search
None
See application file for complete search history.

(56) References Cited

U.S. PATENT DOCUMENTS

| | | | |
|---|---|---|---|
| 5,761,514 A * | 6/1998 | Aizikowitz et al. | 717/158 |
| 5,999,736 A * | 12/1999 | Gupta et al. | 717/158 |
| 6,128,775 A * | 10/2000 | Chow et al. | 717/156 |
| 6,487,716 B1 * | 11/2002 | Choi et al. | 717/159 |
| 6,523,173 B1 * | 2/2003 | Bergner et al. | 717/152 |
| 6,651,247 B1 * | 11/2003 | Srinivasan | 717/161 |
| 7,305,665 B2 * | 12/2007 | Koseki et al. | 717/140 |
| 7,444,626 B2 * | 10/2008 | McIntosh et al. | 717/151 |
| 7,568,193 B2 * | 7/2009 | Rubin et al. | 717/159 |
| 2006/0161908 A1 | 7/2006 | Bearman et al. | |
| 2006/0174227 A1 | 8/2006 | Bearman et al. | |

OTHER PUBLICATIONS

Feigen et al., The Revival Transformation, 1994, Conf. Record of the 21nd ACM Symposium on the Principles of Programming Languages.*
"Path Profile Guided Partial Dead Code Elimination Using Predication", Intl. Conf. on Parallel Arch. and Compilation Techniques, pp. 102-113, San Francisco, California, Nov. 1997. http://citeseer.ist.psu.edu/gupta97path.html.
"Resource-Sensitive Profile-Directed Data Flow Analysis for Code Optimization", 30th IEEE/ACM Intl. Symp. on Microarchitecture, pp. 358-368, Research Triangle Park, NC, Dec. 1997 http://citeseer.ist.psu.edu/21060.html.
Knoop et al., "Partial Dead Code Elimination", Proceedings of the Conference on Programming Language Design and Implementation, New York, NY, Jun. 1994, AC< Press, pp. 147-158.
Ung et al., "Optimising Hot Paths in a Dynamic Binary Translator", ACM SIGARCH Computer Architecture News vol. 29, Issue 1, Mar. 2001, pp. 55-65.
Bellard, "QEMU, a Fast and Portable Dynamic Translator", Proceedings of the USENIX 2005 Annual Technical Conference, Apr. 10-15, 2005, Anaheim, CA, pp. 41-46.

* cited by examiner

*Primary Examiner* — Lewis A Bullock, Jr.
*Assistant Examiner* — Christine Dang
(74) *Attorney, Agent, or Firm* — Yee & Associates, P.C.; David A. Mima, Jr.

(57) ABSTRACT

A computer-implemented method, apparatus, and computer program product to manage variable assignments in a program. The process identifies a set of variable assignments that is live on a portion of paths to form a set of identified variable assignments. Each of the set of identified variable assignments assign a value to at least one variable of a set of variables. The process determines a set of program points at which the set of identified variable assignments is live on all paths. The process also moves the set of identified variable assignments to the set of program points in response to determining that the set of identified variable assignments is movable to the set of program points.

13 Claims, 9 Drawing Sheets

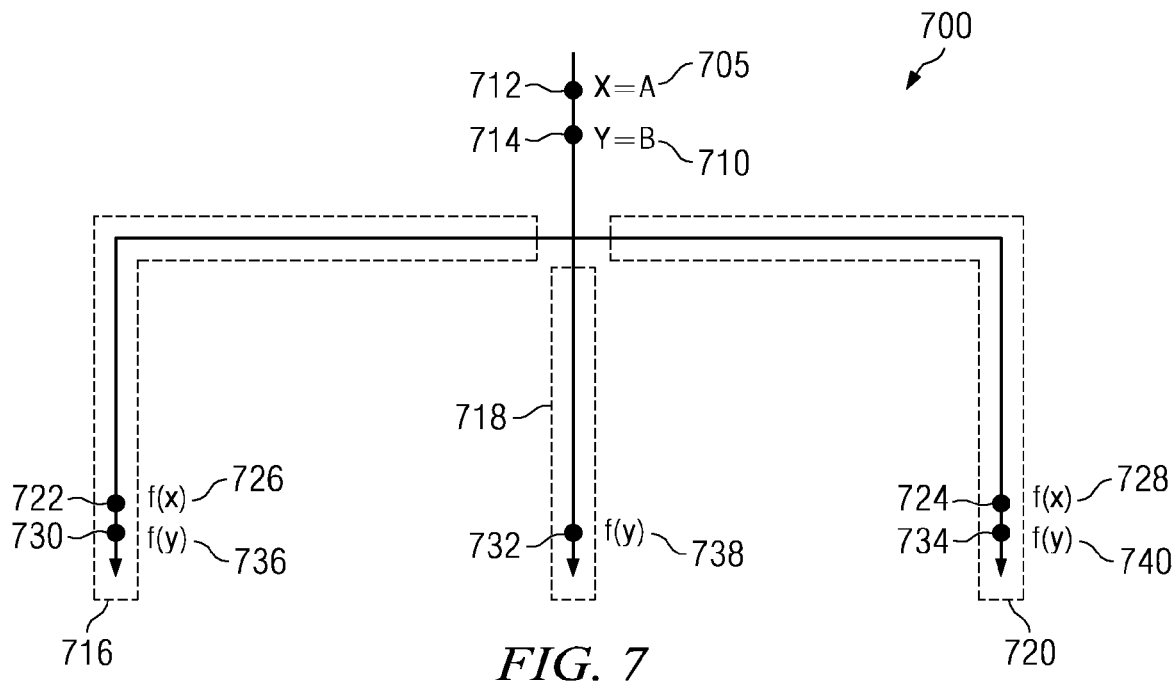

FIG. 7

$$LIVE\_out(b) = \cup \; LIVE\_in(b\_succ_i) \; \forall \; b\_succ_i \in b\text{'s successors}$$
$$LIVE\_in(b) = Gen(b) \cup (LIVE\_out(b) - Kill(b))$$

where

Gen(b) = set of symbols that are used before being defined in b
Kill(b) = set of symbols that are defined in b

FIG. 8

$$LOAP\_out(b) = \cap \; (LOAP\_in(b\_succ:)) \; \forall \; b\_succ: \in b\text{'s successors}$$
$$LOAP\_in(b) = Gen(b) \cup (LOAP\_out(b) - Kill(b))$$

where the Gen and Kill sets are the same as those defined for LIVE.

FIG. 9

$$LONAP\_out(b) = LIVE\_out(b) - LOAP\_out(b)$$
$$LONAP\_in(b) = LIVE\_in(b) - LOAP\_in(b)$$

FIG. 10

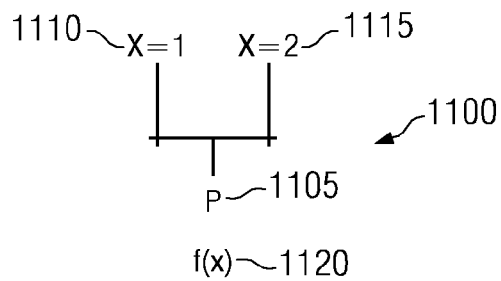

*FIG. 11*

```
                                                         1200
                                                        ↙ if (!storeCanMoveThroughBlock (sourceBlock) || !LONAP_out (sourceBlock))
    cannot sink this assignment
    return
fi
for (all currentBlock in successors of sourceBLock) do
    if (LIVE_in (currentBlock) &&
        shouldSinkStoreAlongEdge (sourceBlock, currentBlock))
        add currentBlock to workList in traversal order
    fi
    add sourceBlock to blocksVisitedWhileSinking list
od
```

Boolean storeCanMoveThroughBlock (b,storeSymbol
    {
    blockKilledSet = symbolsKilledInBlock (b)
    blockUsedSet = symbolsUsedInBlock (b)

Boolean candidateIsNotKilled = blockKilledSet does not intersect
usedSymbolsToMove &&
                                   blockKilledSet does not intersect
killedSymbolsToMove Boolean candidateIsNotUsed = blockUsedSet does not intersect
killedSymbolsToMove
        return candidateIsNotKilled && candidateIsNotUsed
    }
```

*FIG. 13*

```
                                                  1400
                                                 ↙
if (currentBlock in the same extended basic block as sourceBlock)
       usedSymbolsToMove = usedSymbols
     else
       usedSymbolsToMove = (usedSymbol U commonedSymbols)
     fi
```

*FIG. 14*

```
                                                  1500
                                                 ↙
for (pop currentBlock from the workList) do
    if (!checkLiveMergePath (currentBlock))
        record all the LONAP predecessor edge in the edge placement list for
this store
        continue
    fi
    if (!storeCanMoveThroughBlock (currentBlock) || !LONAP_out (currentBlock))
        record currentBlock in the block placement list for this store
        continue
    fi
    add currentBlock to blocksVisitedWhileSinking list
    for (all successors of currentBlock) do
        if (LIVE_in (successorBlock) &&
           shouldSinkStoreAlongEdge (currentBlock, successorBlock))
            add currentBlock to workList in traversal order
        fi
    od
od
```

*FIG. 15*

```
LONAP_out (sourceBlock) = LONAP_out (sourceBlock) - killedSymbolsToMove
LONAP_out (sourceBlock) = LONAP_out (sourceBlock) U usedSymbolsToMove
for all b in blocksVisitedWhileSinking do
        LIVE_in (b) = LIVE_in (b) - _killedSymbolsToMove
        LIVE_in (b) = LIVE_in (b) U_usedSymbolsToMove
        LONAP_in (b) = LONAP_in (b) - killedSymbolsToMove
        LONAP_in (b) = LONAP_in (b) U usedSymbolsToMove
        LONAP_out (b) = LONAP_out (b) - killedSymbolsToMove
        LONAP_out (b) = LONAP_out (b) U usedSymbolsToMove
od
```

*FIG. 16*

```
if assignment was moved out of the sourceBlock
        symbolsUsedInBlock (sourceBlock) = symbolsUsedInBlock (sourceBlock) U commonedLoadsAfter
else
        symbolsUsedInBlock (sourceBlock) = symbolsUsedInBlock (sourceBlock)  U usedSymbolsToMove
        symbolsKilledInBlock (sourceBlock) = symbolsKilledInBlock (sourceBlock)  U killedSymbolsToMove
fi
```

*FIG. 17*

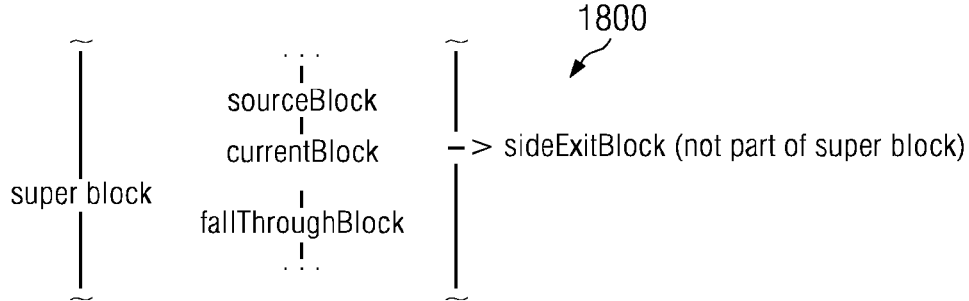

*FIG. 18*

```
1900
↘ currentBlock = sourceBlock
fallThroughBlock = getNextOnTraceBlock (currentBlock)
while (fallThroughBlock != 0 && fallThroughBlock is in the current super
block) do
        if (storeCanMoveThroughBlock (currentBlock))
            for (all successors of currentBlock) do
                if (successorBlock != fallThroughBlock)
                    // successorBlock is the sideExitBlock
         1905 ~ {record successorBlock in the block placement list for this store
(1)
                fi
            od
            currentBlock = fallThroughBlock
            fallThroughBlock = getNextOnTraceBlock (currentBlock)
        else
            fallThroughBlock = 0
        fi
    od
if (sourceBlock != currentBlock)
   1910 ⟋ {record currentBlock in the block placement list for this store (2)
        fi
```

*FIG. 19*

```
                                                        2000
                                                         ↙
if assignment was moved out of the sourceBlock
        symbolsUsedInBlock (sourceBlock) = symbolsUsedInBlock (sourceBlock) U
commonedLoadsAfter
    else
        symbolsUsedInBlock (sourceBlock) = symbolsUsedInBlock (sourceBlock)  U
usedSymbolsToMove
        symbolsKilledInBlock (sourceBlock) = symbolsKilledInBlock (sourceBlock)  U
killedSymbolsToMove
        fi
```

*FIG. 20*

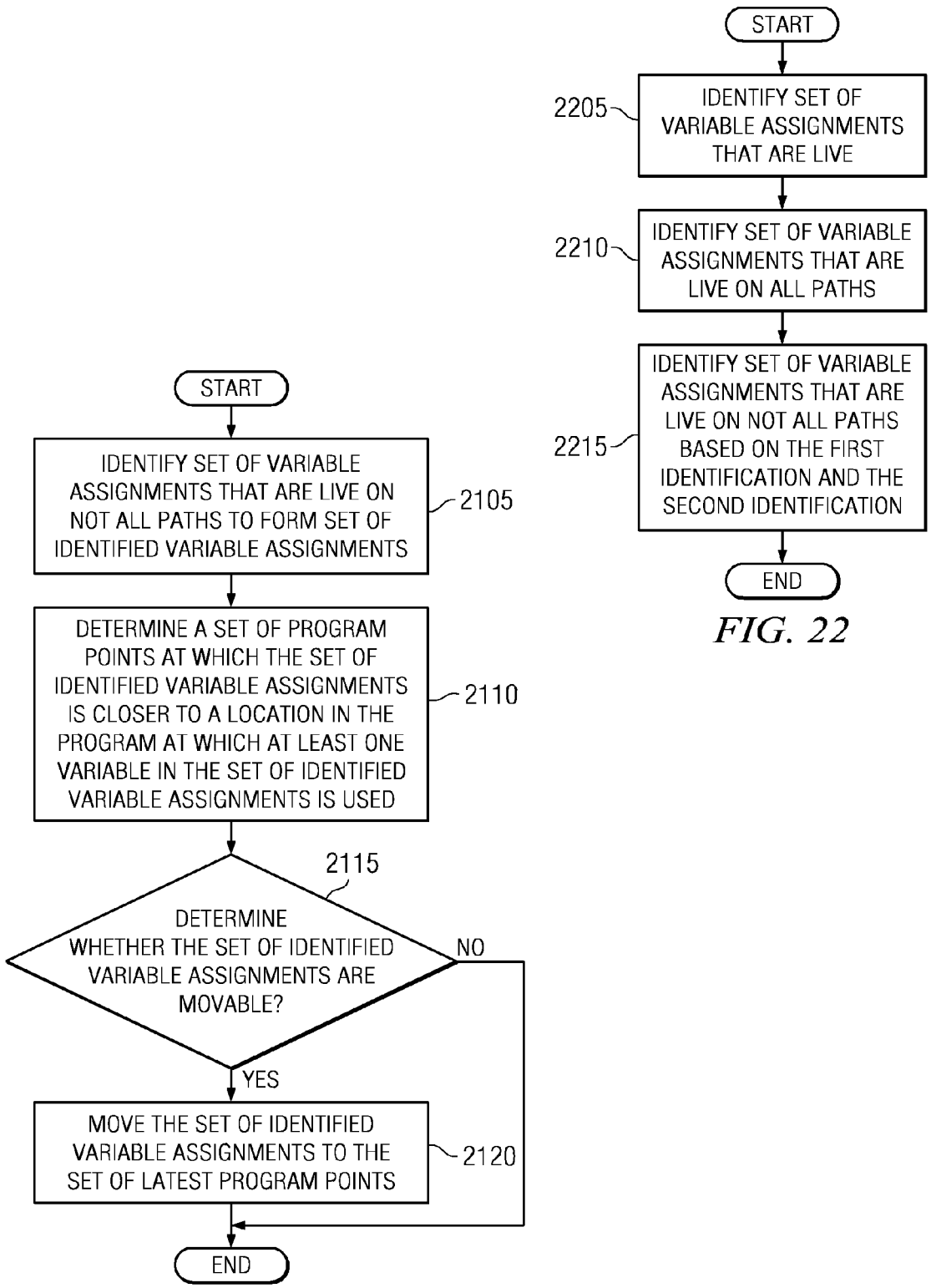
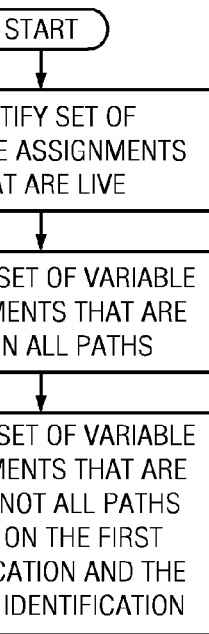
FIG. 21
FIG. 22

MANAGING VARIABLE ASSIGNMENTS IN A PROGRAM

BACKGROUND OF THE INVENTION

1. Field of the Invention

The present invention relates generally to a data processing system and in particular to a method and system for managing variable assignments. More particularly, the present invention is directed to a computer-implemented method, apparatus, and computer-usable program code for managing variable assignments in a program.

2. Description of the Related Art

Computer programs often include variable assignments. A variable assignment is any programming statement in which a variable is assigned a value. The syntax used to assign a variable to a value differs depending on the programming language used to write the program. Non-limiting examples of programming languages that allow variable assignments include Fortran, C, C++, Java, Windows PowerShell, ALGOL, Pascal, Lisp, and COBOL.

Often, the assignment of a value to a variable occurs at a different point in a program than the point at which the variable is used. When program code exists between the point at which the variable is assigned and the point at which the variable is subsequently used, the value of the variable may be kept in a register across the intervening code, thereby preventing the intervening code from using the register during execution. Also, the point at which the variable is used may never occur during execution of the program. For example, the variable may be used in the "if" branch of an if/then statement in a program that executes the "else" branch of the if/then statement. In this example, the register used to store the value of the variable is wasted because the variable is not used during execution of the program.

Variable assignment sinking is an optimization technique used to improve the efficiency of a program by avoiding the unnecessary assignment of variables. Variable assignment sinking moves the variable assignment closer to one or more points in the program at which the assigned variable is used.

One current method for variable assignment sinking involves partial redundancy dataflow analysis to identify the exact locations where a variable assignment is live. A variable assignment is "live" if a program point that occurs after the variable assignment uses the value of the variable in the variable assignment. However, due to the complexity of partial redundancy dataflow analysis, which requires many steps, partial redundancy dataflow analysis is an impractical approach when compile time is an important factor.

Current methods for variable assignment sinking are sometimes used in an emulation environment, in which traces of instructions written for one computer architecture are translated to the instructions for a different, target computer architecture. However, these current methods, when used in an emulation environment, typically remove assignments to emulated state variables from an on trace path, such as condition code computations, via processor specific mechanisms. However, these processor specific mechanisms may not be general enough to be effectively implemented in a system that can target multiple processors.

SUMMARY OF THE INVENTION

The illustrative embodiments described herein provide a computer-implemented method, apparatus, and computer program product for managing variable assignments in a program. The process identifies a set of variable assignments that is live on a portion of paths to form a set of identified variable assignments. Each of the set of identified variable assignments assign a value to at least one variable of a set of variables. The process determines a set of program points at which the set of identified variable assignments is closer to a location in the program at which the at least one variable is used. The process also moves the set of identified variable assignments to the set of program points in response to determining that the set of identified variable assignments is moveable to the set of program points.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a graph illustrating variable assignment paths in accordance with an illustrative embodiment;

FIG. 8 is code for managing variable assignments in a program in accordance with an illustrative embodiment;

FIG. 9 is code for managing variable assignments in a program in accordance with an illustrative embodiment;

FIG. 10 is code for managing variable assignments in a program in accordance with an illustrative embodiment;

FIG. 11 is a graph illustrating variable assignment paths in accordance with an illustrative embodiment;

FIG. 12 is code for managing variable assignments in a program in accordance with an illustrative embodiment;

FIG. 13 is code for managing variable assignments in a program in accordance with an illustrative embodiment;

FIG. 14 is code for managing variable assignments in a program in accordance with an illustrative embodiment;

FIG. 15 is code for managing variable assignments in a program in accordance with an illustrative embodiment;

FIG. 16 is code for managing variable assignments in a program in accordance with an illustrative embodiment;

FIG. 17 is code for managing variable assignments in a program in accordance with an illustrative embodiment;

FIG. 18 is a diagram showing a control flow in a system for managing variable assignments in a program in accordance with an illustrative embodiment;

FIG. 19 is code for managing variable assignments in a program in accordance with an illustrative embodiment;

FIG. 20 is code for managing variable assignments in a program in accordance with an illustrative embodiment;

FIG. 21 is a flowchart illustrating a process for managing variable assignments in a program in accordance with an illustrative embodiment; and FIG. 22 is a flowchart illustrating a process for managing variable assignments in a program in accordance with an illustrative embodiment.

DETAILED DESCRIPTION OF THE PREFERRED EMBODIMENT

Figure 1:
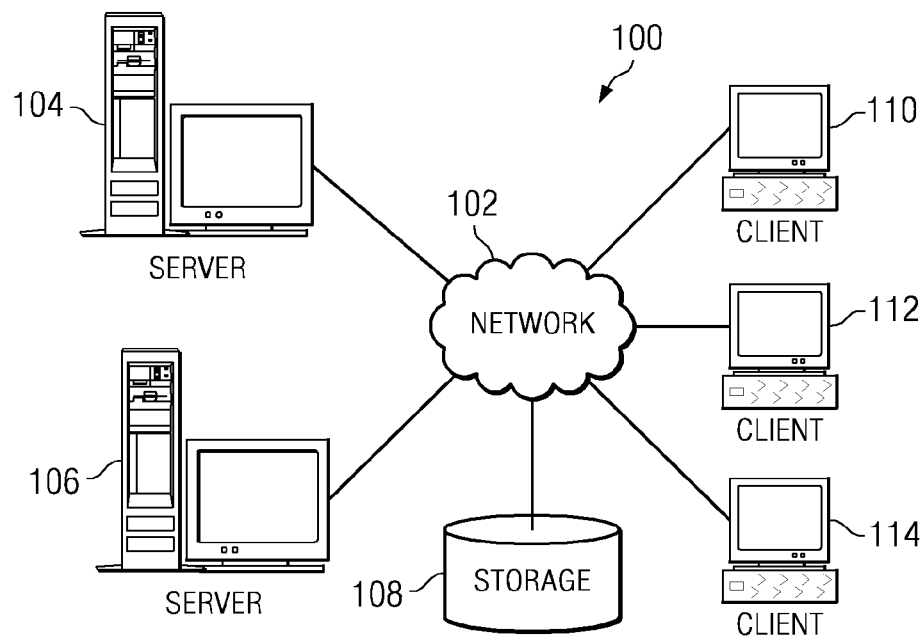
FIG. 1 is a pictorial representation of a network data processing system in which the illustrative embodiments may be implemented.
Figure 2:
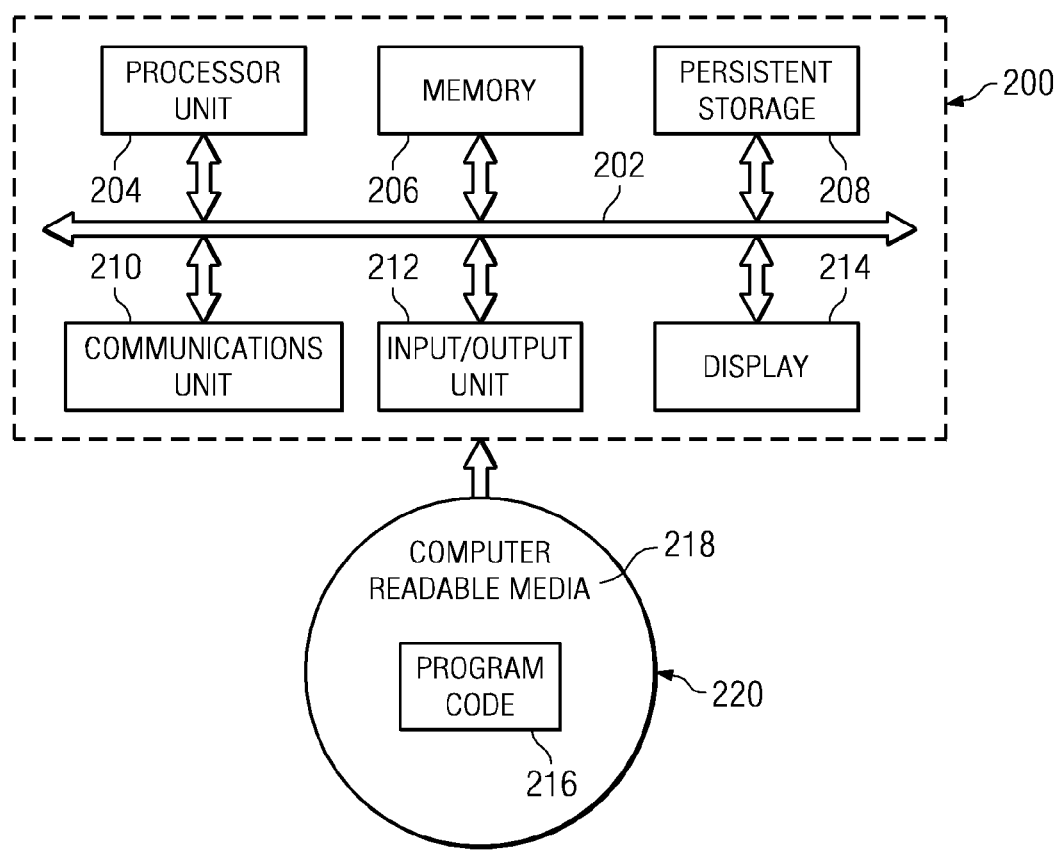
FIG. 2 is a block diagram of a data processing system in which the illustrative embodiments may be implemented.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Servers 104 and 106 may contain software that manages variable assignments in clients 110, 112, and 114. Servers 104 and 106 may also deploy computer-readable code that manages the variable assignments on clients 110, 112, and 114.

Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Memory 206 may store the assigned value of a variable. For example, memory 206 may contain the value given to a variable in a variable assignment. These values may also be contained in registers that are included in memory 206.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 and may be loaded onto or transferred to data processing system 200 for execution by processor unit 204. Program code 216 and computer-readable media 218 form computer program product 220 in these examples. In one embodiment, computer program product 220 is a computer program product for managing variable assignments in a program.

In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive or a flash memory that is connected to data processing system 200. The tangible form of computer-readable media 218 is also referred to as computer recordable storage media.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein provide a computer-implemented method, apparatus, and computer program product for managing variable assignments in a program. A program is one or more executable computer programming statements, such as program code 216 in FIG. 2.

The process identifies a set of variable assignments that is live on a portion of paths to form a set of identified variable assignments. The set of variable assignments includes one or more variable assignments. A path is a portion or sequence of programming statements that are executed during a particular execution of a program. A program may have any number of paths along which execution may occur. In one simple example, the "if" portion and the "else" portion of an "if/then" statement are each separate paths along which execution may take place. In one embodiment, the set of identified variable assignments is live on a "portion" of paths at a set of program points if at least one path, but not all of the paths, from the set of program points use the set of variables. A program point is any location in the program, such as a point between programming statements in the program.

Each of the set of identified variable assignments assign a value to at least one variable of a set of variables. A value is any data capable of being stored in a storage device. The set of variables includes one or more variables.

In one embodiment, the set of variables is a set of local variables. The set of local variables includes one or more local variables. A local variable is a variable that is accessible only from a portion of functions or blocks in a program, such as the function or block in which the local variable is declared. In another embodiment, where more global live variable information is available for global variable assignments, a set of variables includes at least one global variable.

The process determines a set of program points at which the set of identified variable assignments is closer to a set of locations in the program at which the at least one variable is used. The set of locations includes one or more locations in the program. The set of program points includes one or more program points.

In one embodiment, the set of identified variable assignments is live on all paths at the set of program points. In this embodiment, the set of identified variable assignments is live on all paths at the set of program points if each path from the set of program points uses the set of variables. In another embodiment, determining the set of program points at which the set of identified variable assignments is closer to the location in the program at which the at least one variable is used includes determining a first program point in the set of program points for a first identified variable assignment in the set of identified variable assignments before determining a second program point in the set of program points for a second identified variable assignment in the set of identified variable assignments. In this embodiment, the first identified variable assignment occurs later in the program than the second identified variable assignment.

The process also moves the set of identified variable assignments to the set of program points in response to determining that the set of identified variable assignments is movable to the set of program points. In one embodiment, the set of identified variable assignments is movable to the set of program points if no loop function that accesses the set of variables in the set of variable assignments occurs between the set of identified variable assignments and the set of program points. A loop function is a method or function in a program that may be repeated depending on a predetermined condition.

In another embodiment, the set of variable assignments comprises a first variable assignment and a second variable assignment. In this embodiment, the first variable assignment and the second variable assignment include a particular variable. Also in this embodiment, the first variable assignment assigns a first value to the particular variable. Also in this embodiment, the set of identified variable assignments is movable to the set of program points if the second variable assignment at a program point in the set of program points does not overwrite the first value of the particular variable.

Figure 3:
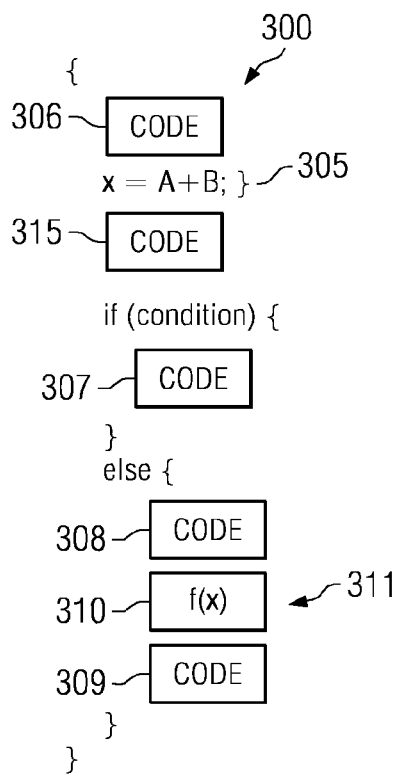
FIG. 3 is code in which variable assignments may be managed in accordance with an illustrative embodiment.

Turning now to FIG. 3, code in which variable assignments may be managed is depicted in accordance with an illustrative embodiment. Specifically, FIG. 3 shows code 300 that contains variable assignment 305. Code portions 306, 307, 308, and 309 contain programming language statements.

As shown in FIG. 3, variable assignment 305 is executed at the beginning of an if/then function. However, the value assigned to variable "x" in variable assignment 305 is used on only one execution path. Specifically, the value of "x" is used in function 310 at program point 311, which occurs in the "else" portion of the if/then statement.

In code 300, the value of variable "x" is susceptible to being kept in a register across code 315, thereby preventing code 315 from using the register during execution. In addition, the value of variable "x" is stored in a register even if the "else" portion of the if/then statement is not executed.

Figure 4:
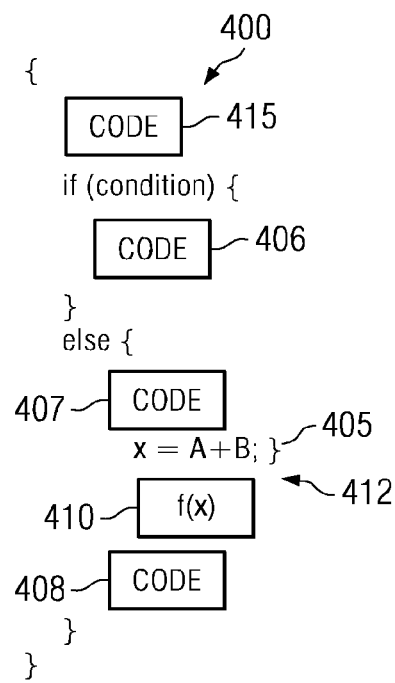
FIG. 4 is code in which variable assignments may be managed in accordance with an illustrative embodiment.

Turning now to FIG. 4, code in which variable assignments may be managed is depicted in accordance with an illustrative embodiment. Specifically, FIG. 4 shows code 400 in which variable assignment 305 in FIG. 3 has been moved in accordance with an illustrative embodiment. Code portions 406, 407, 408, and 415 contain programming language statements.

In FIG. 4, variable assignment 405 has been moved to program point 412, which is the program point just before function 410, which uses the value of variable "x". Because variable assignment 405 has been moved to program point 412, the value of variable "x" is computed closer to the point at which variable "x" is used, which optimizes the generation of code. This optimization improves register efficiency and eliminates variable assignment instructions from paths where the value of the assigned variable will not be used. Such elimination of variable assignment instructions is also known as partial dead store elimination.

Furthermore, once variable assignments, such as variable assignment 405, in code 400 is moved, code transformations of code 400, which otherwise would have required global analyses, are now more likely to be candidates for simpler, more local analyses.

The movement of variable assignments in a program may result in an error or the incorrect assignment of a value to a variable. The safety of moving variable assignment 405 can depend on the value of "A" and "B", and whether "A and B" are modified in the code, across which variable assignment 405 is moved. Moreover, if an optimization technique known as expression commoning has made the evaluation point of the expression "A+B" earlier than the program point at which variable assignment 405 is located, then code between the evaluation point and the program point at which variable assignment 405 is located may impact the safety of moving variable assignment 405. Expression commoning is a compiler optimization in which multiple occurrences of the same expression are identified and if possible, replaced by a load from a register or a variable if it can be proven that the value of a given occurrence of the expression would be the same as it was at a prior occurrence of the expression that is certain to have been executed.

Figure 5:
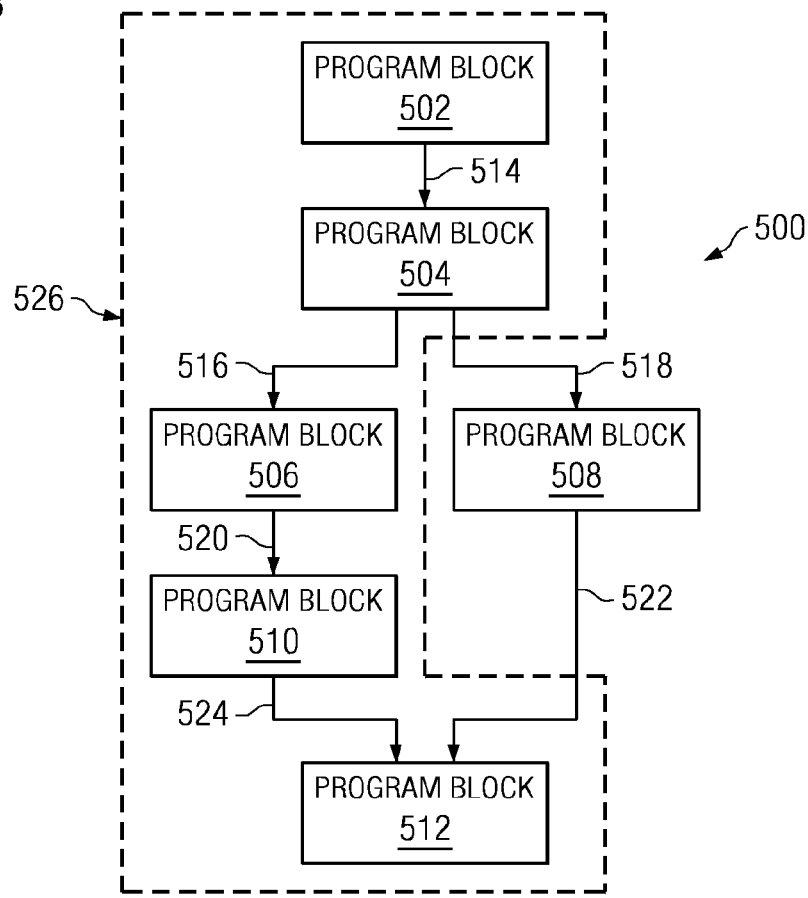
FIG. 5 is a block diagram of program blocks in which variable assignments may be managed in accordance with an illustrative embodiment.

Moving now to FIG. 5, a block diagram of program blocks in which variable assignments may be managed is depicted in accordance with an illustrative embodiment. Specifically, FIG. 5 shows program block diagram 500, which shows multiple program blocks for program code, such as program code 216 in FIG. 2.

Program block diagram 500 includes program blocks 502, 504, 506, 508, 510, and 512. Program blocks 502, 504, 506, 508, 510, and 512 represent actual portions of code in a computer program. Specifically, a program block is one or more programming statements that are each executed, from first to last, when the program block is executed, unless an exception or trap occurs.

Program block diagram 500 also includes edges 514, 516, 518, 520, 522, and 524. An edge is a representation of the order in which the programming blocks in a program may be executed. This representation may be determined by one or more programming language statements. For example, this representation may be determined by the last statement in a block immediately preceding the edge. For example, in FIG. 5, edges 514, 516, 518, 520, 522, and 524 may represent programming language statements that determine the order in which program blocks 502, 504, 506, 508, 510, and 512 are executed. Edges 514, 516, 518, 520, 522, and 524 also determine which of program blocks 502, 504, 506, 508, 510, and 512 are executed.

In one example, edge 516 is an "if" statement and edge 518 is an "else" statement. In this example, program block 506 may be a portion of code that occurs in the body of the "if" statement and program block 508 may be a portion of code that occurs in the body of the "else" statement. In this example, edges 516 and 518 determine which of program blocks 506 and 508 are executed during the execution of the program represented by program block diagram 500.

Program block diagram 500 also shows path 526. Path 526 is a path along which the program represented by program block diagram 500 may execute.

Figure 6:
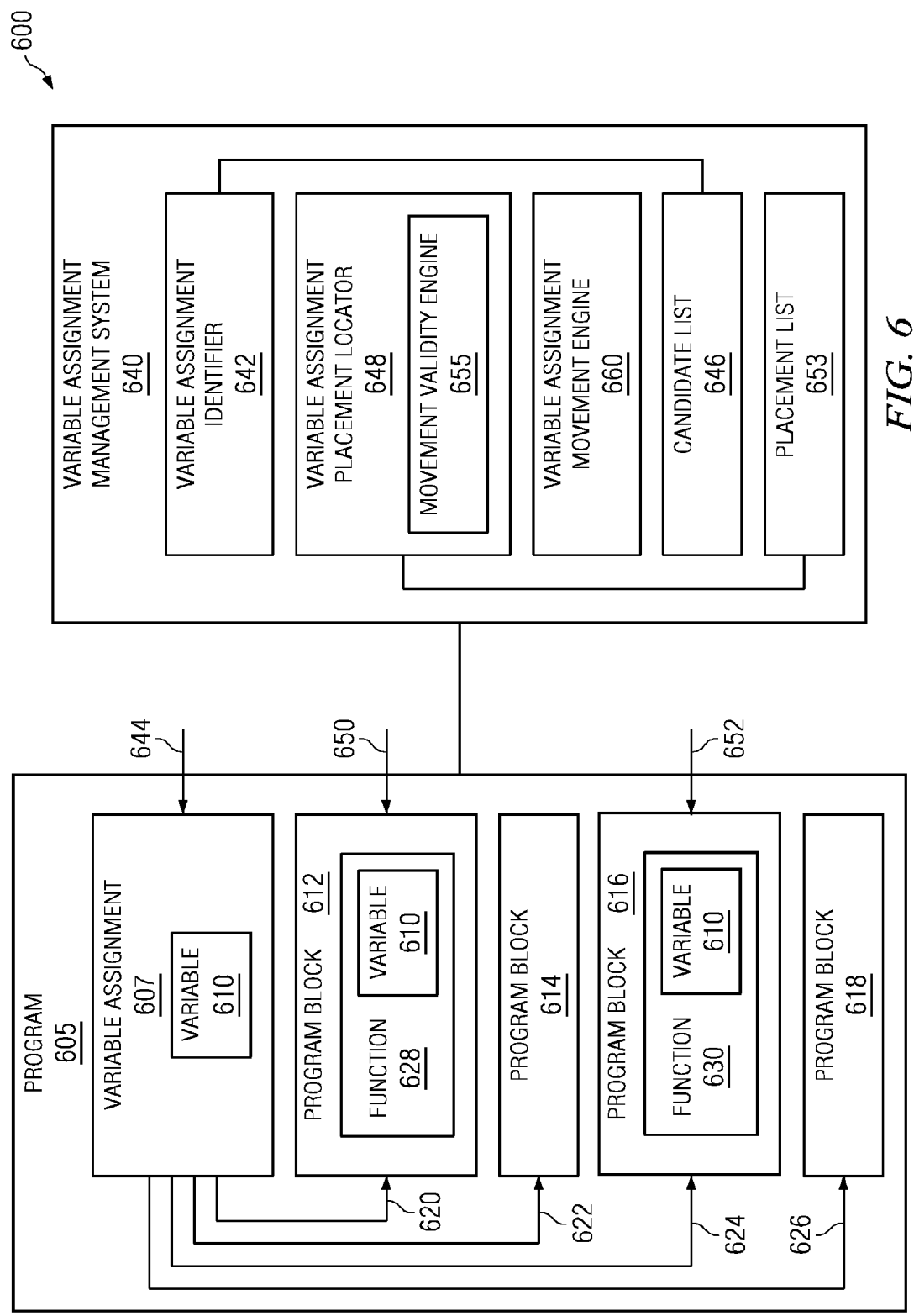
FIG. 6 is a block diagram of a system for managing variable assignments in a program in accordance with an illustrative embodiment.

Turning now to FIG. 6, a block diagram of a system for managing variable assignments in a program is depicted in accordance with an illustrative embodiment. Specifically, FIG. 6 shows data processing system 600, which contains components to manage variable assignments in a program. Data processing system 600 may be implemented in data processing system 100 in FIG. 1, data processing system 200 in FIG. 2, or any one of servers 104 and 106 and clients 110, 112, and 114 in FIG. 1.

Data processing system 600 includes program 605. Program 605 is a set of instructions that is executed on data processing system 600. Program 605 may be included in software, middleware, firmware, hardware, or any other media compatible with data processing system 600. Also, the instructions contained in program 605 may be expressed in any computer language. For example, program 605 may be expressed in Fortran, C, C++, Java, Windows PowerShell, ALGOL, Pascal, Lisp, or COBOL. In one specific example, program 605 is written using a programming language that is capable of being compiled using a just in time compiler.

Program 605 includes variable assignment 607, which assigns a value to variable 610. Program 605 also includes program blocks 612, 614, 616, and 618. From variable assignment 607, program blocks 612, 614, 616, and 618 may be executed along paths 620, 622, 624, and 626, respectively. Program blocks 612 and 616 each includes functions 628 and 630, respectively. Functions 628 and 630 each use variable 610.

Although program 605 is shown to include four program blocks, namely program blocks 612, 614, 616, and 618, program 605 may include any number of program blocks. Any portion of these program blocks may contain functions that use variable 610 or the value thereof. In addition, program 605 may contain any number of variables and variable assignments, such as variable 610 and variable assignment 607. In one example, only a portion of the total code contained by program 605 is shown in FIG. 6, and program 605 contains additional variable assignments, variables, and program blocks not shown in FIG. 6.

Data processing system 600 includes variable assignment management system 640, which manages variable assignments in program 605. Variable assignment management system 640 includes variable assignment identifier 642.

Variable assignment identifier 642 may identify variable assignments in program 605 as live, live on all paths, and live on not all paths. A variable assignment is "live" if a program point that occurs after the variable assignment uses the value of the variable in the variable assignment. A variable assignment that includes a variable to which a value is assigned is "live on all paths" at a particular program point if the variable is used on every path that can occur after the particular program point. A variable assignment that includes a variable to which a value is assigned is "live on not all paths" at a particular program point if fewer than all paths, but at least one path, that can occur after the particular program point use the variable. Thus, when a variable assignment is live on not all paths, some paths exist along which the variable will not be used at all, and at least one path exists along which the variable will be used.

Variable assignment identifier 642 identifies variables assignments in program 605 that are live on not all paths to form a set of identified variable assignments. Each of the set of identified variable assignments assigns a value to at least one variable.

In one embodiment, variable assignment identifier 642 traverses the program blocks in program 605 in a post-order manner to identify a set of variable assignments that is live on not all paths to form a set of identified variable assignments. Post-order is an order that is opposite of the order of execution of program 605.

Thus, in one embodiment, variable assignment identifier 642 determines whether each variable assignment in program 605 is live on not all paths to form a determination. In this embodiment, the determination occurs for each variable assignment in an order that is reverse from an order of execution of program 605.

In another embodiment, variable assignment identifier 642 determines whether each program block in program 605 includes one or more variable assignments that are live on not all paths to form a determination. In this embodiment, the determination occurs for each program block in an order that is reverse from an order of execution of program 605. Variable assignment identifier 642 may also traverse the expression trees in reverse order to identify the set of identified variable assignments. An expression tree is an internal representation used by the compiler for each individual expression or computation that must be evaluated as specified by statements in the program. A node can have an arbitrary number of children or nodes, each of which represents sub-expressions that a given expression depends on. For example, the expression "a+b" may depend on "a" and "b" being evaluated first. Child nodes are evaluated before the parent node and a compiler usually has a list of expression trees in each program block that are used to denote the statements within that program block.

In FIG. 6, variable assignment identifier 642 identifies variable assignment 607 as being live on not all paths to form a set of identified variable assignments. Although in FIG. 6, the set of identified variable assignments includes only variable assignment 607, the set of identified variable assignments may include any number of variable assignments that are live on not all paths.

As shown in FIG. 6, variable assignment 607 occurs at program point 644. In one embodiment, identifying variable assignment 607 as live on not all paths 620, 622, 624, and 626 to form a set of identified variable assignments includes determining that less than all paths but at least one path of paths 620, 622, 624, and 626 from program point 644 uses variable 610. In program 605, program blocks 612 and 616, which occur along paths 620 and 624, respectively, contain functions 628 and 630 that use variable 610. However, program blocks 614 and 618, which occur along paths 622 and 626, respectively, contain no functions that use variable 610. Thus, out of paths 620, 622, 624, and 626, only paths 620 and 626 use variable 610. Accordingly, at least one but less than all paths from program point 644 uses variable 610. In another embodiment, variable assignment identifier 642 determines that variable assignment 607 is live on less than all paths 620, 622, 624, and 626 from program point 644.

In another embodiment, variable assignment identifier 642 identifies a first set of variable assignments that is live to form a first identification. In program 605, variable assignment identifier 642 identifies variable assignment 607 as part of the first set of variable assignments that is live because variable assignment 607 is live along paths 620 and 624. In this embodiment, variable assignment identifier 642 also identifies a second set of variable assignments that is live on all paths to form a second identification. In program 605, variable assignment 607 is not identified as part of the second set of variable assignments because variable assignment 607 is not live along all paths 620, 622, 624, and 626. In this embodiment, variable assignment identifier 642 identifies the set of variable assignments that is live on not all paths to form the set of identified variable assignments using the first identification and the second identification. With respect to program 605, variable assignment identifier 642 identifies that variable assignment 607 is live on not all paths based on the first identification, in which variable assignment 607 was identified as live, and the second identification, in which variable assignment identifier 642 failed to identify variable assignment 607 as live on all paths 620, 622, 624, and 626.

In one embodiment, dataflow analysis is used to determine the variable assignments in program 605 that are live on not all paths. In this embodiment, variable assignments that are live and variable assignments that are live on all paths are computed, from which the variable assignments that are live on not all paths may be computed. Additional details regarding this dataflow analysis will be provided with respect to FIGS. 8 through 10 below.

In one embodiment, variable assignment identifier 642 stores each identified variable assignment, such as variable assignment 607, in candidate list 646. Candidate list 646 stores potentially moveable variable assignments. As detailed below, candidate list 646 may be used by variable assignment placement locator 648 to determine the proper program point to which a particular variable assignment should be moved.

Variable assignment management system 640 also includes variable assignment placement locator 648. Variable assignment placement locator 648 determines a set of program points at which the set of identified variable assignments is closer to a location in the program at which the at least one variable is used. At the set of program points determined by variable assignment placement locator 648, the set of identified variable assignments may remain to be live on not all paths. However, because the set of identified variable assignments is closer to a location in the program at which the at least one variable is used, better use of storage space is achieved by preventing the use of such storage space across some portions of code in program 605. Thus, with respect to FIG. 6, program point 644 may correspond to a program point to which variable assignment 607 may be moved from an earlier point in program 605, even though variable assignment 607 is live on not all paths at program point 644.

In one embodiment, the set of identified variable assignments is live on all paths at the set of program points. In one embodiment, these program points are stored in placement list 653. With respect to program 605, variable assignment placement locator 648 determines that program points 650 and 652 are the program points at which variable assignment 607 is live on all paths. Variable assignment 607 is live on all paths at program points 650 and 652 because variable 610 is used on the only paths that emanate from program points 650 and 652. Namely, variable 610 is used at function 628 after program point 650. Also, variable 610 is used at function 630 after program point 652.

In one embodiment, the set of identified variable assignments that are identified by variable assignment identifier 642 is live on all paths at a set of program points, such as program points 650 and 652, if each path from the set of program points uses the set of variables included in the set of identified variable assignments. For example, variable assignment 607, which is identified by variable assignment identifier 642, is live on all paths at program points 650 and 652 because each path emanating from program points 650 and 652 uses variable 610.

In one embodiment, variable assignment placement locator 648 examines the program blocks, such as the program blocks in program 605, in post-order. By traversing the program blocks in program 605 in post-order, variable assignments that are below a particular program block are moved as much as possible because of analyzing the variable assignments in the particular program block. Such post-order traversal allows the movement of variable assignments in program 605 to be performed with potentially fewer constraints. For example, when variable assignment placement locator 648 traverses the program blocks in program 605 in post-order, a variable assignment placed on candidate list 646 may be optimistically assumed not to obstruct the movement of any variable assignment earlier in a program block.

Once an entire extended program block has been traversed for potentially movable variable assignments, variable assignment placement locator 648 may then process candidate list 646 one variable assignment at a time to determine whether the variable assignment may be safely and correctly moved out of the variable assignment's original block. An extended program block is a sequence of one or more program blocks that have the property that only the first program block in the extended program block has a predecessor that is from outside the extended program block and each program block in the extended program block has the previous program block in the extended program block as its sole predecessor. An extended program block has only one entry but may have multiple exit blocks. Variable assignment placement locator 648 may indicate and store variable assignments that are determined to be non-movable so that unsafe movements of other potentially movable variable assignments are prevented.

In one embodiment, candidate list 646 has been processed by variable assignment placement locator 648 when all the expression trees from a single extended program block have been examined. In this embodiment, candidate list 646 holds only variable assignments from a single extended block at a time. Each variable assignment on candidate list 646 is examined again in the reverse order than they appear in program 605 so, if a particular variable assignment cannot be moved out of the block, earlier variable assignments that are blocks by the particular variable assignment are not improperly allowed to be moved.

For each variable assignment in candidate list 646, variable assignment placement locator 648 determines where the variable assignment should be placed in program 605 so that the variable assignment is live on all paths. Conceptually, the variable assignment is moved along the edges of a control flow graph, such as program block diagram 500 in FIG. 5, using a worklist algorithm that has been modified to deal effectively with branches and merges. Examples of such worklist algorithms will be provided with respect to FIGS. 12 and 15 below. The purpose of the worklist algorithm is to sink the variable assignment along control flow edges and program blocks where the assigned variable is live, starting at the block originally containing the variable assignment. If a program point is reached where the assigned variable is live on all paths, then the sinking ends. If a program point is reached beyond which the assignment cannot correctly be sunk, then sinking ends. Examples of such program points will be provided in the next paragraphs. New copies of the variable assignment are created to sink along multiple control flow edges leaving a program block where the variable assignment is live. Where multiple control flow edges merge to enter program block B, copies of the variable assignment sunk along each incoming edge are coalesced and sunk into B if the assignment can be correctly sunk into B.

In one embodiment, data about variables that are used and killed by a variable assignment that is not moved is maintained by variable assignment management system 640 so that a particular variable assignment found later in candidate list 646 can be prevented from moving if the particular variable assignment is blocked by the presence of the unmoved variable assignment. For example, the particular variable assignment may be blocked by the presence of the unmoved variable assignment if the unmoved variable assignment uses a variable redefined by the particular variable assignment or changes a variable read by the particular variable assignment. In one example, "killed" refers to those variables whose value is changed, for example, by assignment, and as a consequence, it is not possible to move assignments to these variables and it is also not possible to move assignments to other variables where the right-hand side of the assignment depends on some variable(s) whose value was changed.

In another embodiment, variable assignment placement locator 648 determines the program points for the set of variable assignments identified by variable assignment identifier 642 to form a determination. With respect to program 605, variable assignment placement locator 648 determines program points 650 and 652 for variable assignment 607 to form a determination. In this embodiment, the determination occurs for each identified variable assignment in an order that is reverse from an order of execution of program 605.

In another embodiment, variable assignment placement locator 648 determines a program point for each identified variable assignment in the set of program blocks in program 605 to form a determination for each identified variable assignment in program 605. In this embodiment, the determination for each identified variable assignment in the set of program blocks occurs for each program block in an order that is reverse from an order of execution of program 605.

In another embodiment, variable assignment placement locator 648 determines a first program point for a first identified variable assignment in the set of identified variable assignments identified by variable assignment identifier 642. In this embodiment, the first program point is determined by variable assignment placement locator 648 before determining a second program point for a second identified variable assignment in the set of identified variable assignments. In this embodiment, the first identified variable assignment occurs later in the program than the second identified variable assignment.

Variable assignment placement locator 648 includes movement validity engine 655. Movement validity engine 655 determines whether the set of variables assignments identified by variable assignment identifier 642 is moveable to the set of program points determined by variable assignment placement locator 648. In one embodiment, movement validity engine 655 may modify the program points stored in placement list 653. With respect to program 605, movement validity engine 655 determines whether variable assignment 607 is moveable to program points 650 and 652.

In one embodiment, movement validity engine 655 determines that variable assignment 607 is moveable to program points 650 and 652 by determining that no loop function occurs between variable assignment 607 and program points 650 and 652. In another embodiment, movement validity engine 655 determines that variable assignment 607 is moveable to program points 650 and 652 by determining that the number of incoming edges matches the number of edges on which variable assignment 607 is live on all paths. In this embodiment, this determination may be made at each program block as it is taken from the worklist (i.e. as a variable assignment is propagated along edges on which the variable assignment is live).

In another embodiment, the set of variable assignments in program 605 includes a first variable assignment and a second variable assignment. In this embodiment, the first variable assignment and the second variable assignment include a particular variable. Also in this embodiment, the first variable assignment assigns a first value to the particular variable. In this embodiment, movement validity engine 655 determines that the second variable assignment at a program point to which the second variable assignment may be moved does not overwrite the first value of the particular variable.

Within a program block on an extended program block, the expression trees may be examined in reverse order to identify potentially moveable variable assignments, which may then be placed on candidate list 646. Candidate variable assignments may be variable assignments in which the variable assigned by the variable assignment is live on not all paths. Also, candidate variable assignments may be variable assignments in which the variable assignment tree may be safely moved to the end and out of a program block, as determined by movement validity engine 655.

In one embodiment, the safety of moving a variable assignment, as determined by movement validity engine 655, depends on whether the variables used by the variable assignment, such as the variables that appear on the right-hand side of the variable assignment, are changed after the variable assignment but before the end of the basic program block. If expression commoning has been applied so that a variable's original value can be used after the variable has been redefined, then expression trees that precede the variable assignment must also be examined to determine if the variable assignment can be safely moved to the end and outside of the program block. Code modifications may be performed in situations where expression commoning has introduced an artificial constraint on the variable assignment's movement out of the program block.

In one embodiment, the algorithms used by variable assignment placement locator 648 may take at least two different forms. In one of these forms, the algorithms are suitable for a compiler. Such algorithms are presented below with respect to FIGS. 12 through 17. In another one of these forms, the algorithms are suitable for a binary translator. A binary translator is a compiler that operates within an emulator. An emulator is a software program that takes as input the instructions of one computer architecture and simulates the effect of executing those instructions on the same or different computer architecture. An exemplary input to a binary translator is a list, or trace, of instructions from a particular runtime execution. Such algorithms are presented below with respect to FIGS. 19 and 20.

Variable assignment management system 640 includes variable assignment movement engine 660. In one embodiment, variable assignment movement engine 660 processes placement list 653 and performs the actual code transformation accordingly. In one example, variable assignment movement engine 660 may move the variable assignments in program 605 as determined by variable assignment identifier 642, variable assignment placement locator 648, and movement validity engine 655.

For each block placement in placement list 653, assignment expressions will be generated and inserted, in order, at the beginning of a specified block. For each edge placement in placement list 653, the variable assignments may be placed in a newly created block that has the edge's successor redirected to the block and the block's successor redirected to point to the original target block of the edge. If multiple variable assignments, such as multiple variable assignments that include different variables, are moved to the same location, the variable assignments may appear in the same order in their new program points as they appeared in the original program.

In another embodiment, redundant edge placements may be coalesced into a single program block rather than creating multiple edges. Redundant edge placements are edges that have the same destination program block and the same set of variable assignments.

After moving all the new variable assignment placements, the original variable assignment may be deleted or marked as a void expression with no side effects. Marking the original variable assignment as a void expression may simplify implementation in the presence of expression commoning. In one embodiment, subsequent optimizations, such as dead expression elimination, may be applied to remove the void expressions.

In one embodiment, variable assignment management system 640 includes three phases. In this embodiment, the first phase includes an identification of a set of variable assignments that is live on not all paths to form a set of identified variable assignments. The first phase may be performed by variable assignment identifier 642. In this embodiment, the second phase may include a determination of whether and where identified variable assignments may be moved, and capturing the results of this determination in a placement list, such as placement list 653. The second phase may be performed by variable assignment placement locator 648.

In this embodiment, the third phase may actually transform program 605 according to placement list 653. The third phase may be performed by variable assignment movement engine 660. Also, copy propagation and dead store elimination may be run to ensure that temporary variables created during the variable assignment moving process can be eliminated.

Turning now to FIG. 7, a graph illustrating variable assignment paths is depicted in accordance with an illustrative embodiment. Specifically, FIG. 7 shows paths along which program 700 may execute. Program 700 is a non-limiting example of program 605 in FIG. 6 or program code 216 in FIG. 2.

Program 700 includes variable assignments 705 and 710. Variable assignments occur at program points 712 and 714, respectively.

Program 700 also has three paths 716, 718, and 720 along which program 700 may execute. As described in FIG. 6, a variable assignment management system, such as variable assignment management system 640 in FIG. 6, may be used to determine whether a variable assignment in a program is live, live on all paths, and live on not all paths. FIG. 7 illustrates how a variable assignment is determined to be in any combination of these categories.

Regarding variable assignment 705, program points 722 and 724 occur after program point 712 at which variable assignment 705 occurs. At program points 722 and 724, the value of "x", which is assigned a value in variable assignment 705, is used in functions 726 and 728. Thus, variable assignment 705 is live because a program point at which variable "x" is used occurs after program point 712.

However, variable "x" is not used on all of the paths that occur after program point 712. Specifically, variable "x" is used on paths 716 and 720, but is not used on path 718. Thus, variable assignment 705 is live on not all paths.

Regarding variable assignment 710, program points 730, 732, and 734 occur after program point 714 at which variable assignment 710 occurs. At program points 730, 732, and 734, the value of "y", which is assigned a value in variable assignment 710, is used in functions 736, 738, and 740. Thus, variable assignment 710 is live because a program point at which variable "y" is used occurs after program point 714.

Additionally, variable "y" is used on all paths 716, 718, and 720 that occur after program point 714. Thus, variable assignment 710 is live on all paths.

Turning now to FIG. 8, code for managing variable assignments in a program is depicted in accordance with an illustrative embodiment. In one example, code 800 may be implemented by variable assignment identifier 642 in FIG. 6.

In one embodiment, code 800 is a liveness dataflow analysis that computes the program points at which a variable assignment is live. In this embodiment, code 800 computes the program points for a variable assignment at which there is some path following those program points that uses the value of the variable stored in the variable assignment. As shown in code 800, "live" at the in and out of a program block "b", together with the gen and kill sets for the basic program blocks, can be expressed as backward iterative dataflow equations.

Turning now to FIG. 9, code for managing variable assignments in a program is depicted in accordance with an illustrative embodiment. In one example, code 900 may be implemented by variable assignment identifier 642 in FIG. 6.

In one embodiment, code 900 is a live on all path dataflow analysis (LiveOnAllPath), which may be used to compute program points in which the value of a variable in a variable assignment is live on all paths that follow those program points. As shown by code 900, the basic program block in and out sets for LiveOnAllPath may be computed by iterative dataflow equations. In code 900, the gen and kill sets may be the same as those defined for code 800 in FIG. 8.

Turning now to FIG. 10, code for managing variable assignments in a program is depicted in accordance with an illustrative embodiment. In one example, code 1000 may be implemented by variable assignment identifier 642 in FIG. 6.

In one embodiment, code 1000 is used to identify the program points at which a variable assignment is live on not all paths. In this embodiment, code 1000 may be used to describe program points in which the value of a variable in a variable assignment is partially live at the program block. Also, code 1000 may be used to describe program points in which the value of a variable in a variable assignment is live on at least one path, but for which there also exists at least one successor along which the value is not live. As illustrated by code 1000, such program points at which a variable assignment is live on not all paths may be computed directly from the results of the code 800 in FIG. 8 and code 900 in FIG. 9.

Turning now to FIG. 11, a graph illustrating variable assignment paths is depicted in accordance with an illustrative embodiment. The analysis illustrated with respect to path graph 1100 may be implemented by movement validity engine 655 in FIG. 6.

When moving a variable assignment along a path in which the successor has another live on not all paths predecessor, the movement validity engine may be required to determine whether any other live on not all path predecessors are reachable by the same variable assignment. If other live on not all paths predecessors are reachable from the program point to which the variable assignment may be moved, then the variable assignment cannot be moved past this program point.

This situation is illustrated by path graph 1100. Path graph 1100 includes program point 1105, in which two earlier variable assignments 1110 and 1115 to variable "x" are both live. In this situation, neither of variable assignments 1110 nor 1115 may be sunk to program point 1105 without potentially overwriting the other variable assignment's value.

If variable assignment 1110 is allowed to sink to program point 1105, then there exists no way for function 1120, which uses variable "x", to load the value of 2 for variable "x", even if the program represented by path graph 1100 executes the path that includes variable assignment 1115. Similarly, variable assignment 1115 cannot be allowed to sink to program point 1105. Thus, in path graph 1100, neither variable assignments 1110 nor 1115 may sink to program point 1105.

Also, detecting the number of live on all path predecessors along which a particular variable assignment has been propagated may be accomplished by performing the propagation in reverse post-order such that all predecessors of a particular program block are examined before the particular program block is examined. Detecting the number of live on all path predecessors along which a particular variable assignment has been propagated may also be accomplished by maintaining a count, associated with each program block, of the number of edges along which the variable assignment has been propagated.

In one embodiment, a checkLiveMergePath algorithm, which is detailed in the following figures, checks whether the number of incoming edges matches the number of edges along which the variable is live on all paths. If they are equal, then the variable assignment has been propagated along all incoming edges and the variable assignment may safely be propagated into the program block. If they are not equal, then the variable assignment may not safely be propagated into the program block.

Turning now to FIG. 12, code for managing variable assignments in a program is depicted in accordance with an illustrative embodiment. Specifically, code 1200 is a non-limiting example of a variable assignment sinking function that may be implemented by variable assignment placement locator 648 in FIG. 6 in a compiler environment. Code 1200 is part of a placement algorithm that is implemented in a compiler, and which is illustrated by non-limiting examples in FIGS. 12 through 17. In one example, the placement algorithm that may be implemented by a compiler can propagate variable assignments through a general control flow graph.

The variable assignment sinking function shown by code 1200 is performed on sourceBlock. sourceBlock is the basic program block containing the variable assignment to be moved. sourceBlock is part of the input to placement algorithm. currentBlock, also used by code 1200, is initialized to sourceBlock at the start of the placement algorithm, and is then updated to point to the basic program block being examined at each stage of the placement algorithm.

Code 1200 uses workList. workList is a list of basic program blocks where the variable assignments can access and sink. Code 1200 uses blocksVisitedWhileSinking. blocksVisitedWhileSinking is a list of basic program blocks visited in the sinking paths.

Code 1200 includes the shouldSinkStoreAlongEdge(b1, b2) routine, which takes b1 and b2 as inputs. shouldSinkStoreAlongEdge(b1,b2) checks if a variable assignment may be safely sunk from program block b1 to program block b2. shouldSinkStoreAlongEdge(b1,b2) is tuned based on profiling information. As variable assignment placements are recorded on edges, shouldSinkStoreAlongEdge(b1,b2) must verify that the variable assignment can safely traverse this edge even in the presence of sunk variable assignments placed along the identified edge. For code 1200 in particular, shouldSinkStoreAlongEdge is performed using sourceBlock as b1 and currentBlock as b2.

Code 1200 also includes the storeCanMoveThroughBlock (b) routine. storeCanMoveThroughBlock(b) is describe in greater detail in FIG. 13 below.

Turning now to FIG. 13, code for managing variable assignments in a program is depicted in accordance with an illustrative embodiment. Specifically, FIG. 13 shows code

1300, which is a non-limiting example of a storeCan-MoveThroughBlock(b) routine used in code 1200 in FIG. 12. The storeCanMoveThroughBlock(b) illustrated by code 1300 accepts program block b as an input.

Code 1300 checks if a variable assignment can be move to the end of program block b. If storeCanMoveThroughBlock (b) returns a true value, then the variable assignment can be move to the end of program block b. Otherwise, the variable assignment cannot be move to the end of program block b.

Code 1300 includes the killedSymbolstoMove symbol set. The killedSymbolstoMove symbol set variable includes every symbol the variable assignment directly kills or defines. Code 1300 includes the symbolsKilledinBlock(b) symbol set, which accepts program block b as an input. The symbolsKilledinBlock(b) symbol set represents the symbols killed in program block b below the current expression tree. The symbolsKilledinBlock(b) symbol set is updated as the expression trees are examined in reverse order in program block b.

Code 1300 also includes the symbolsUsedinBlock(b) symbol set, which accepts program block b as an input. The symbolsUsedinBlock(b) symbol set represents the symbols used in program block b below the current expression tree. The symbolsUsedinBlock(b) symbol set is updated as the expression trees are examined in reverse order in program block b. Code 1300 also includes the usedSymbolstoMove symbol set, which is discussed in greater detail in FIG. 14.

Turning now to FIG. 14, code for managing variable assignments in a program is depicted in accordance with an illustrative embodiment. Specifically, FIG. 14 shows code 1400, which is an expression of the usedSymbolstoMove symbol set used in code 1300 in FIG. 13. The usedSymbolstoMove symbol set represents every symbol the variable assignment directly uses. The usedSymbolstoMove symbol set may depend on a commoning scenario.

Turning now to FIG. 15, code for managing variable assignments in a program is depicted in accordance with an illustrative embodiment. Specifically, FIG. 15 shows code 1500, which is a non-limiting example of a portion of a variable assignment sinking function that may be implemented by variable assignment placement locator 648 in FIG. 6 in a compiler environment.

In one embodiment, code 1500 is repeatedly executed as each basic program block is taken from the workList. In code 1500, each program block is examined to determine whether the variable assignment should sink (1) at the edge before the program block, (2) at the entry of the program block, or (3) through the program block and continue sinking.

When a program block or edge placement is recorded in the same extended basic program block as the sourceBlock, then the assignment tree is recorded as part of the placement information. However, when the placement is outside of the extended basic program block, then a copy of the variable assignment, with the commoned symbols replaced by the temporary symbols, is recorded instead of the placement information.

In one embodiment, code 1500 will terminate when all possibilities of the sunk locations from the workList are exhausted. The sunk locations may be kept in the variable assignment placement lists.

Turning now to FIG. 16, code for managing variable assignments in a program is depicted in accordance with an illustrative embodiment. Specifically, FIG. 16 shows code 1600, which is a non-limiting example of a portion of a variable assignment sinking function that may be implemented by variable assignment placement locator 648 in FIG. 6 in a compiler environment. In code 1600, the used symbols, the killed symbols, and the dataflow equations for the basic program blocks are updated along the sunk path. Non-limiting examples of dataflow equations are code 800, 900, and 1000 in FIGS. 8, 9, and 10, respectively.

Turning now to FIG. 17, code for managing variable assignments in a program is depicted in accordance with an illustrative embodiment. Specifically, FIG. 17 shows code 1700, which is a non-limiting example of a portion of a variable assignment sinking function that may be implemented by variable assignment placement locator 648 in FIG. 6 in a compiler environment. In code 1700, dataflow symbolsKilledInBlock and symbolsUsedInBlock are updated. This update, as performed by code 1700, may depend on the result of the sinking of variable assignments.

Turning now to FIG. 18, a diagram showing a control flow in a system for managing variable assignments in a program is depicted in accordance with an illustrative embodiment. Specifically, FIG. 18 shows control flow 1800, which illustrates a flow of control of a variable assignment placement function that may be implemented by variable assignment placement locator 648 in FIG. 6 in a binary translator.

In a binary translator environment, the variable assignment placement function is implemented differently to leverage the unique control flow present in this environment. For each candidate variable assignment, an efficient algorithm is used to place the variable assignment as low as possible in the control flow graph. In one example, this variable assignment placement function requires no dataflow computations and may operate on the input symbol sets. The variable assignment placement function may be used for sinking variable assignments in a control flow graph for a program trace.

As shown in control flow 1800, the variable assignment placement function, portions of which are shown in FIGS. 19 and 20, attempts to traverse all basic program blocks, including the sourceBlock in each super block. A super block, depicted in control flow 1800, is one or more basic blocks that together have one entry and multiple exits. In one example, a super block differs from an extended basic program block in that a super block does not include any side exit blocks.

In one embodiment, the control flow can split at a currentBlock either because of a natural change in control flow, such as a branch, or to handle an exceptional case. When the control flow splits, the program block that handles the change in control flow and then immediately exits the trace or method may be called the sideExitBlock, as shown in control flow 1800. In control flow 1800, sideExitBlock is not part of the super block. Also, the program block that continues the super block may be called the fallThroughBlock, as shown in control flow 1800.

Turning now to FIG. 19, code for managing variable assignments in a program is depicted in accordance with an illustrative embodiment. Specifically, FIG. 19 shows code 1900, which is a non-limiting example of a portion of a variable assignment sinking function that may be implemented by variable assignment placement locator 648 in FIG. 6 in a binary translator environment.

Code 1900 iterates over all blocks in the super block using the input symbol sets to copy the variable assignment to the side exit blocks and to move the variable assignment to the fall through block. In record line 1905, the side exit blocks are necessarily outside of the super block so a copy of the variable assignment, with the commoned symbols replaced by the temporary symbols, is recorded in the placement information. In record line 1910, the currentBlock is, by definition, in the same super block such that the variable assignment is recorded as part of the placement information.

Code 1900 uses the function getNextOnTraceBlock(b), which accepts program block b as an input. In one example, the getNextOnTraceBlock(b) function returns the fallThroughBlock, such as fallThroughBlock in FIG. 18, for a given program block.

Turning now to FIG. 20, code for managing variable assignments in a program is depicted in accordance with an illustrative embodiment. Specifically, FIG. 20 shows code 2000, which is a non-limiting example of a portion of a variable assignment sinking function that may be implemented by variable assignment placement locator 648 in FIG. 6 in a binary translator environment. In one example, code 2000 updates the input symbol sets to reflect the movement of variable assignments that have occurred.

Other symbol sets that may be used in any of the code portions of FIGS. 12 through 20 include usedSymbols, commonedSymbols, and commonedLoadsAfter. The usedSymbols symbol set represents every symbol a variable assignment directly uses. An indirect use would come from a commoned reference, and these are dealt with separately. The commonedSymbols symbol set represents all symbols the variable assignment uses through a commoned reference. The commonedLoadsAfter symbol set represents all symbols that are first used in the variable assignment and then commoned after the variable assignment.

Turning now to FIG. 21, a flowchart illustrating a process for managing variable assignments in a program is depicted in accordance with an illustrative embodiment. The process illustrated by the flowchart in FIG. 21 may be implemented by a variable assignment management system, such as variable assignment management system 640 in FIG. 6.

The process begins by identifying a set of variable assignments that are live on not all paths to form a set of identified variable assignments (step 2105). The process determines a set of program points at which the set of identified variable assignments is closer to a location in the program at which at least one variable in the set of identified variable assignments is used (step 2110).

The process determines whether the set of identified variable assignments are movable (step 2115). If the process determines that the set of identified variable assignments are not movable, the process terminates. Returning to step 2115, if the process determines that the set of identified variable assignments are movable, then the process moves the set of identified variable assignments to the set of program points (step 2120).

Turning now to FIG. 22, a flowchart illustrating a process for managing variable assignments in a program is depicted in accordance with an illustrative embodiment. The process illustrated in FIG. 22 may be implemented by a variable assignment identifier, such as variable assignment identifier 642 in FIG. 6. The process illustrated in FIG. 22 provides a non-limiting example of steps that may occur with respect to step 2105 in FIG. 21.

The process begins by identifying a set of variable assignments that are live to form a first identification (step 2205). The process identifies a set of variable assignments that are live on all paths to form a second identification (step 2210). The process identifies a set of variable assignments that are live on not all paths based on the first identification and the second identification (step 2215).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer-implemented method, apparatus, and computer program product for managing variable assignments in a program. The process identifies a set of variable assignments that is live on not all paths to form a set of identified variable assignments. A program may have any number of paths along which execution may occur. In one embodiment, the set of identified variable assignments is live on not all paths at a set of program points if less than all paths, but at least one path, from the set of program points use the set of variables. Each of the set of identified variable assignments assign a value to at least one variable of a set of variables. In one embodiment, the set of variables is a set of local variables.

The process determines a set of program points at which the set of identified variable assignments is closer to a location in the program at which the at least one variable is used. In one embodiment, the set of identified variable assignments is live on all paths at the set of program points. In this embodiment, the set of identified variable assignments is live on all paths at the set of program points if each path from the set of program points uses the set of variables. In another embodiment, determining the set of program points at which the set of identified variable assignments is closer to the location in the program at which the at least one variable is used includes determining a first program point in the set of program points for a first identified variable assignment in the set of identified variable assignments before determining a second program point in the set of program points for a second identified variable assignment in the set of identified variable assignments. In this embodiment, the first identified variable assignment occurs later in the program than the second identified variable assignment.

The process also moves the set of identified variable assignments to the set of program points in response to determining that the set of identified variable assignments is movable to the set of program points. In one embodiment, the set of identified variable assignments is movable to the set of program points if no loop function occurs between the set of identified variable assignments and the set of program points.

In another embodiment, the set of variable assignments comprises a first variable assignment and a second variable assignment. In this embodiment, the first variable assignment and the second variable assignment include a particular variable. Also in this embodiment, the first variable assignment assigns a first value to the particular variable. Also in this embodiment, the set of identified variable assignments is movable to the set of program points if the second variable assignment at a program point in the set of program points does not overwrite the first value of the particular variable.

Thus, the illustrative embodiments can allow transformation of code in the traditional compiler sense with the goal of generating faster code for a target processor by eliminating partially redundant variable assignments. A dynamic compiler, whose compile time is included in program execution time, can benefit from these illustrative embodiments. Significant and unique opportunities also exist in a binary translation environment. Dynamic compilers for emulators may be called binary translators. The illustrative embodiments allow for the movement of variable assignments in more timeeffective manner, and can be of particular use in the context of dynamic compilers and binary translators, where compile time is important.

In an emulation environment, many types of emulated system states are written but not read on the trace. Typical emulated system state variables include register values, instruction addresses, and condition codes. For example, setting condition codes is a common side effect of many processor instructions, but these codes may not be read by the instruction on the trace. Without knowing what may happen when program flow leaves the trace; however, the condition code values set by the various instructions in the trace may be needed. By sinking the code that computes these condition codes to trace exits, as may be done using the illustrated embodiments, the execution of the instructions on the trace can be made much more efficient.

The illustrative embodiments may rely on only two dataflow analyses compared to the five required for partial redundancy elimination solutions. Specifically, the illustrative embodiments may rely on the live and live on all paths analyses. In a binary translator environment, the illustrative embodiments may rely on only one dataflow analyses compared to the five required for partial redundancy elimination solutions. Specifically, the illustrative embodiments may rely on the live analyses only. In addition, the simpler control flow present in binary translator program traces (no loop back-edges or control flow merges) makes this single dataflow analysis inexpensive to compute.

Also, because the illustrative embodiments can move variable assignments in reverse order, more opportunities for movement may be created. For example, if a live on not all paths variable assignments uses a variable that is stored earlier in a program block, then the earlier variable assignment will appear as a live on all paths variable assignment unless the later variable assignment is first moved. In a binary translator environment, the assignments are processed in a reverse order and the live analyses information is updated after each store to create more opportunities for earlier variable assignments to be moved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing variable assignments in a program, comprising the program containing a plurality of paths, wherein each path is a portion or sequence of programming statements that are executed during a particular execution of the program, and one or more variable assignments located at one or more corresponding program points, wherein each variable assignment assigns a value to a variable;

identifying one or more variable assignments in the program that is live on only a portion of the plurality of paths from the corresponding program point by examining each variable assignment in an order that is reverse from an order of execution of the program to form one or more identified variable assignments, for each identified variable assignment, determining, in an order that is reverse from an order of execution of the program, one or more program points at which the identified variable assignment would be closer to one or more locations in the program at which the variable of the identified variable assignment is used, responsive to determining the one or more program points, determining whether the identified variable assignment is movable to the one or more program points, wherein the identified variable assignment is movable to the one or more program points if the identified variable assignment is live on all of a plurality of paths from the one or more program points, wherein the one or more identified variable assignments is live on all of the plurality of paths at the one or more program points if each of the plurality of paths from the one or more program points uses the variable of the identified variable assignment, and responsive to determining that the identified variable assignment is movable to the one or more program points, moving the identified variable assignment to the one or more program points.

2. The computer-implemented method of claim 1, wherein the identifying step comprises:

identifying a first set of variable assignments that is live to form a first identification;

identifying a second set of variable assignments that is live on all paths to form a second identification; and identifying the set of variable assignments that is live on the portion of the paths to form the set of identified variable assignments using the first identification and the second identification.

3. The computer-implemented method of claim 1, wherein the identifying step comprises:

determining whether each variable assignment in the program is live on the portion of the paths to form a determination, wherein the determination occurs for each variable assignment in an order that is reverse from an order of execution of the program.

4. The computer-implemented method of claim 1, wherein the identifying step comprises:

determining whether each program block in the program includes one or more variable assignments that are live on the portion of the paths to form a determination, wherein the determination occurs for each program block in an order that is reverse from an order of execution of the program.

5. The computer-implemented method of claim 1, wherein the identifying comprises:

storing each of the set of identified variable assignments in a candidate list that stores potentially movable variable assignments.

6. The computer-implemented method of claim 1, wherein determining the set of program points at which the set of identified variable assignments is closer to the set of locations in the program at which the at least one variable is used comprises:

determining a program point in the set of program points for each identified variable assignment in a set of program blocks to form a determination for each identified variable assignment, wherein the determination for each identified variable assignment in the set of program blocks occurs for each program block in an order that is reverse from an order of execution of the program.

7. The computer-implemented method of claim 1, wherein determining the set of program points at which the set of identified variable assignments is closer to the set of locations in the program at which the at least one variable is used comprises:

determining a first program point in the set of program points for a first identified variable assignment in the set of identified variable assignments before determining a second program point in the set of program points for a second identified variable assignment in the set of identified variable assignments, wherein the first identified variable assignment occurs later in the program than the second identified variable assignment.

8. The computer-implemented method of claim 1, wherein determining that the set of identified variable assignments is movable to the set of program points comprises:

determining that no loop function occurs between the set of identified variable assignments and the set of program points.

9. The computer-implemented method of claim 1, wherein determining that the set of identified variable assignments is movable to the set of program points comprises:

determining that a number of incoming edges matches a number of edges on which the set of identified variable assignments is live on the portion of the paths.

10. The computer-implemented method of claim 1, wherein the set of variable assignments comprises a first variable assignment and a second variable assignment, wherein the first variable assignment and the second variable assignment include a particular variable, wherein the first variable assignment assigns a first value to the particular variable, and wherein determining that the set of identified variable assignments is movable to the set of program points comprises:

determining that the second variable assignment at a program point in the set of program points does not overwrite the first value of the particular variable.

11. The computer-implemented method of claim 1, wherein the set of variables is a set of local variables.

12. A computer program product comprising:

a non-transitory computer-usable medium having computer-usable program code for managing variable assignments in a program, the computer program product comprising:

computer-usable program code for identifying a one or more variable assignments that is live only on a portion of a plurality of paths in the program by examining each variable assignment in an order that is reverse from an order of execution of the program to form one or more identified variable assignments, wherein each of the one or more identified variable assignments assigns a value to a variable, and wherein the one or more variable assignments is located at one or more corresponding program points, and each of the paths is a portion or sequence of programming statements that are executed during a particular execution of the program, and for each identified variable assignment, computer-usable program code for determining, in an order that is reverse from an order of execution of the program, one or more program points at which the identified variable assignment would be closer to one or more locations in the program at which the variable of the identified variable assignment is used;

computer-usable program code for responsive to determining the one or more program points, determining whether the identified variable assignment is movable to the one or more program points, wherein the identified variable assignment is movable to the one or more program points if the one or more program points is live on all of the plurality of paths at the one or more program points, wherein the identified variable assignment is live on all of the plurality of paths at the one or more program points if each of the plurality of paths from the one or more program points uses the variables of the identified variable assignment, and computer-usable program code for responsive to determining that the identified variable assignment is movable to the one or more program points, moving the identified variable assignment to the one or more program points.

13. A data processing system comprising:

a bus system;

a memory connected to the bus system, wherein the memory includes a set of instructions; and a processing unit connected to the bus system, wherein the processing unit executes the set of instructions to identify one or more variable assignments that is live on only a portion of a plurality of paths by examining each variable assignment in an order that is reverse from an order of execution of a program to form one or more identified variable assignments, wherein each of the one or more identified variable assignments assigns a value to a variable, and wherein the one or more variable assignments is located at one or more corresponding program points, and each of the paths is a portion or sequence of programming statements that are executed during a particular execution of the program, and for each identified variable assignment, determines, in an order that is reverse from an order of execution of the program, one or more program points at which the identified variable assignment is closer to one or more locations in the program at which the variable of the identified variable assignment is used, responsive to determining the set of program points, determines whether the identified variable assignment is movable to the one or more program points, wherein the identified variable assignment is movable to the one or more program points if the one or more program points is live on all of the plurality of paths at the one or more program points, wherein the identified variable assignment is live on all of the plurality of paths at the one or more program points if each of the plurality of paths from the one or more program points uses the variables of the identified variable assignment; and moves the identified variable assignment to the one or more program points in response to determining that the identified variable assignment is movable to the one or more program points.

* * * * *